UNITED STATES PATENT OFFICE 2,248,033

MANUFACTURE OF CEMENTS FROM CALCIUM SULPHATE AND BLAST FURNACE SLAG

Nelson Elliot Wallace, Norton-on-Tees, and Victor Lefebure, London, England, assignors to Imperial Chemical Industries Limited, a corporation of Great Britain No Drawing. Application February 23, 1939, Serial No. 257,818. In Great Britain February 22, 1938

3 Claims. (Cl. 106—85)

(Granted under the provisions of sec. 14, act of March 2, 1927; 357 O. G. 5)

This invention relates to cements obtained from calcium sulphate and granulated blast furnace slag.

Blast furnace slag is the molten non-metallic by-product obtained during the production of iron in a blast furnace, and it is granulated by rapid cooling, e. g. by running a stream of slag into water. The slag is thus obtained in a glassy or non-crystalline form possessing hydraulic or water-setting properties, especially when mixed with an exciter such as an alkali or a sulphate, or both. The exciter chiefly used in these cements is Portland cement clinker, which liberates lime during setting. The general function of this "exciter" is to produce and accelerate optimum setting conditions and strength, particularly early strength.

It has been found that increase in the proportion of Portland cement clinker above a certain limit causes the cement to become weaker. It would thus be expected that a well proportioned cement of this type contained the maximum amount of lime for optimum development of hardness and strength.

One object of the present invention is still further to increase the strength of cements of the kind described. A further object is to increase the surface hardness of such cements.

We have now found that the addition of lime to the setting cement in such a form as to make it available in the later stages of setting produces stronger and harder cements, even though they contain already the optimum proportions of clinker.

According to the present invention, therefore, we improve the strength and hardness of cements comprising blast furnace slag, calcium sulphate and Portland cement clinker, by allowing the cement to set in the presence of additional lime derived from a liquid medium in contact with the setting cement or from a lime-containing or lime-producing substance (other than Portland cement clinker) added to the mix.

The invention includes cements of the kind described to which have been added lime-containing or lime-producing substances (other than Portland cement); also moulded objects and masses made from the said cements.

In carrying out the invention we preferably employ cements of the kind described and claimed in Dunn et al. U. S. application Serial No. 257,816, namely cements comprising blast furnace slag, calcium sulphate and a lime-containing or lime-producing exciter (in this case Portland cement clinker), in which at least 60 per cent. of the slag particles, at least 50 per cent. of the exciter particles, and at least 60 per cent. of the final mixed cement particles, are of diameter not exceeding 30 microns. As the calcium sulphate constituent of the cement we prefer to employ natural anhydrite.

The additional lime may be supplied in various ways, amongst which we have found the following to be very effective:

(a) By curing the setting cement in lime water
(b) By addition to the cement of ground hydrated lime which has been allowed to set to a solid mass with water, and subsequently crushed or ground to form relatively coarse particles
(c) By addition of ground set Portland cement to the cement
(d) By the addition of partially set Portland cement to the cement
(e) By addition of crushed sand/lime bricks to the cement
(f) By addition of crushed calcium sulphate (plaster of Paris) containing 10–20% calcium hydroxide to the cement.

If desired the substances (b)–(f) inclusive may be used in substitution for part of the Portland cement clinker. They may be added either in the finely ground condition or as coarse particles.

The following example illustrates the advantage of curing the setting cement in lime water.

Example 1

A cement was prepared containing 85 parts by weight of ground granulated blast furnace slag, 15 parts of anhydrite and 5.4 parts Portland cement clinker. Two samples of the setting cement were cured in water and in lime water respectively. The tensile strengths were as under:

|  | Tensile strength (lbs./sq. in.) | | |
| --- | --- | --- | --- |
|  | After 3 days | After 7 days | After 28 days |
| Cured in water | 280 | 445 | 485 |
| Cured in lime water | 350 | 490 | 615 |

The following example illustrates the increased surface hardness obtained by the use of additions of crushed set calcium sulphate containing lime.

*Example 2*

A mixture was made up of ten parts by weight of plaster of Paris to one part of hydrated lime. It was allowed to set and was then crushed to pass the No. 52 B. S. S. sieve and be retained on the No. 100 B. S. S. sieve. Twenty per cent. of this was added to a calcium sulphate-slag cement containing Portland cement as "exciter." Neat and 3:1 sand-cement bars were made and their surface hardness was compared with similar bars made from calcium sulphate-slag cement without the addition of the lime containing particles. In the following table are given measurements of the diameter of the depression produced by a Brinell hardness punch; the smaller the diameter, the harder is the surface.

| Mix | | Punch impression in mm. after— | | |
|---|---|---|---|---|
| | | 3 days | 7 days | 28 days |
| Neat | With addition | 3.45 | 3.25 | 3.45 |
| Neat | Without addition | 3.65 | 3.7 | 3.6 |
| 3 : 1 | With addition | 3.45 | 3.5 | 3.6 |
| 3 : 1 | Without addition | 3.95 | 4.05 | 3.8 |

The following example illustrates the increased surface hardness obtained by curing calcium sulphate-slag cements in lime water.

*Example 3*

In this case, the difference in surface hardness between 3:1 mortar stored in fresh and in lime water was estimated by scratching the surface of the mortar with a nail and awarding a mark based on the impression of hardness gained. As an example, the following marks were awarded.

| Storage medium | Hardness mark after storage for— | | | | |
|---|---|---|---|---|---|
| | 3 days | 7 days | 28 days | 3 months | 6 months |
| Lime water | FG | FG | G | VG | VG |
| Fresh water | P | P | F | FG | F |

P = poor  FG = fairly good
F = fair  VG = very good
G = good

As many apparently widely different embodiments of this invention may be made without departing from the spirit and scope thereof, it is to be understood that the invention is not limited to the specific embodiments thereof except as defined in the appended claims.

We claim:

1. A method of improving the strength and hardness of cements comprising granulated blast furnace slag, calcium sulphate and Portland cement clinker, which comprises gauging the cement with water, allowing it to partially set, and treating the partially set cement with a liquid medium containing lime.

2. A method according to claim 1, in which the setting cement is treated with lime water.

3. A method of improving the strength and hardness of cements comprising granulated blast furnace slag, calcium sulphate and Portland cement clinker, in which at least 60 per cent of the slag particles, at least 50 per cent of the Portland cement particles, and at least 60 per cent of the final mixed cement particles are of diameter not exceeding 30 microns, which comprises gauging the cement with water, allowing it to partially set, and treating the partially set cement with a liquid medium containing lime.

NELSON ELLIOT WALLACE.
VICTOR LEFEBURE.